J. D. WEBBER.
APPARATUS FOR REGULATING THE FLOW OF VARIOUS MATERIALS.
APPLICATION FILED JAN. 10, 1913.

1,162,002.

Patented Nov. 30, 1915.
4 SHEETS—SHEET 1.

WITNESSES:

INVENTOR
J. D. Webber,
BY
Mitchell, Chadwick & Kent,
ATTORNEYS

J. D. WEBBER.
APPARATUS FOR REGULATING THE FLOW OF VARIOUS MATERIALS.
APPLICATION FILED JAN. 10, 1913.
1,162,002.
Patented Nov. 30, 1915.
4 SHEETS—SHEET 4.
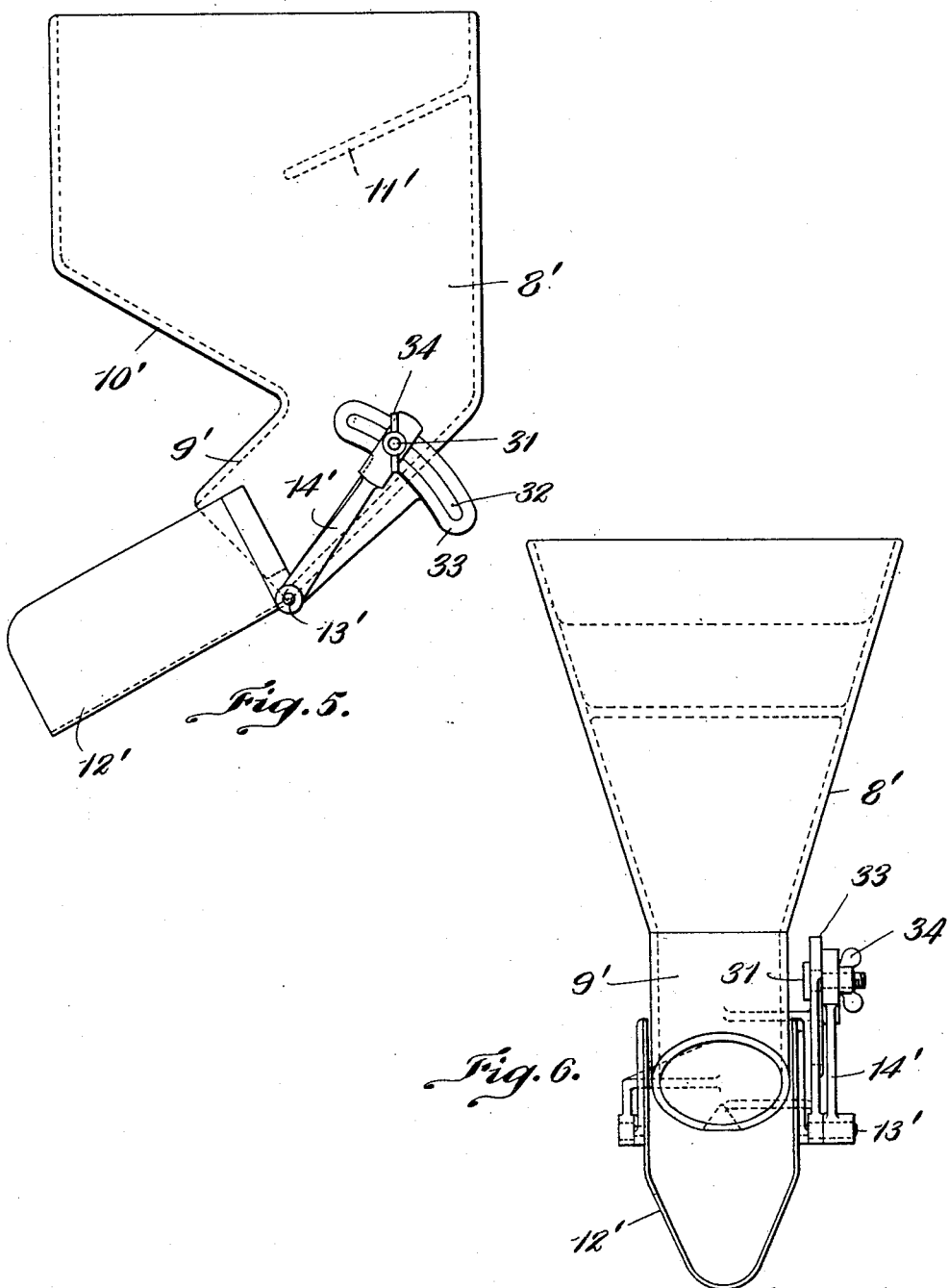

UNITED STATES PATENT OFFICE.

JOHN D. WEBBER, OF BAYONNE, NEW JERSEY, ASSIGNOR TO AUTOMATIC WEIGHING MACHINE COMPANY, OF NEWARK, NEW JERSEY, A CORPORATION OF NEW YORK.

APPARATUS FOR REGULATING THE FLOW OF VARIOUS MATERIALS.

1,162,002. Specification of Letters Patent. Patented Nov. 30, 1915.

Application filed January 10, 1913. Serial No. 741,175.

*To all whom it may concern:*

Be it known that I, JOHN D. WEBBER, a citizen of the United States, residing at Bayonne, in the county of Hudson and State of New Jersey, have invented new and useful Improvements in Apparatus for Regulating the Flow of Various Materials, of which the following is a specification.

In the weighing of various materials by automatic weighing machines, of which materials unground coffee may be taken as a good example, it has been found very difficult to deliver a steady and uniform stream of the material to the weighing bucket or other receptacle without interfering with the obtaining of accurate weights, for the reason that if the discharge opening through which the stream of material passes is less than a certain size, the grains of material will occasionally form an arch or bridge across the opening and thus choke the flow, while if said opening is large enough to prevent this the stream will be so voluminous that the machine cannot always be relied on to weigh uniform loads. In the case of coffee berries, for example, the discharge opening, assuming that it is substantially circular, must have a diameter of at least one and one-eighth inches in order to prevent arching, but the berries will flow through an orifice of this size so fast that small loads cannot be successfully weighed by the machine, not only because the weights are liable to be inaccurate but also because they will be completed in the weighing receptacle faster than they can be taken care of. My invention is intended to overcome the difficulty above explained by providing an apparatus by means of which a material such as coffee berries may be delivered in a steady and uniform stream, the volume of which may be regulated as desired without danger of stoppage of the stream by choking of the discharge orifice. My improvements also include means whereby the flow of the stream may be automatically controlled by the action of an automatic weighing machine, but my stream-delivering arrangement is useful independently of such a machine, as, for example, for the purpose of supplying a regulated stream of material to a measuring or packaging apparatus.

Figure 1:
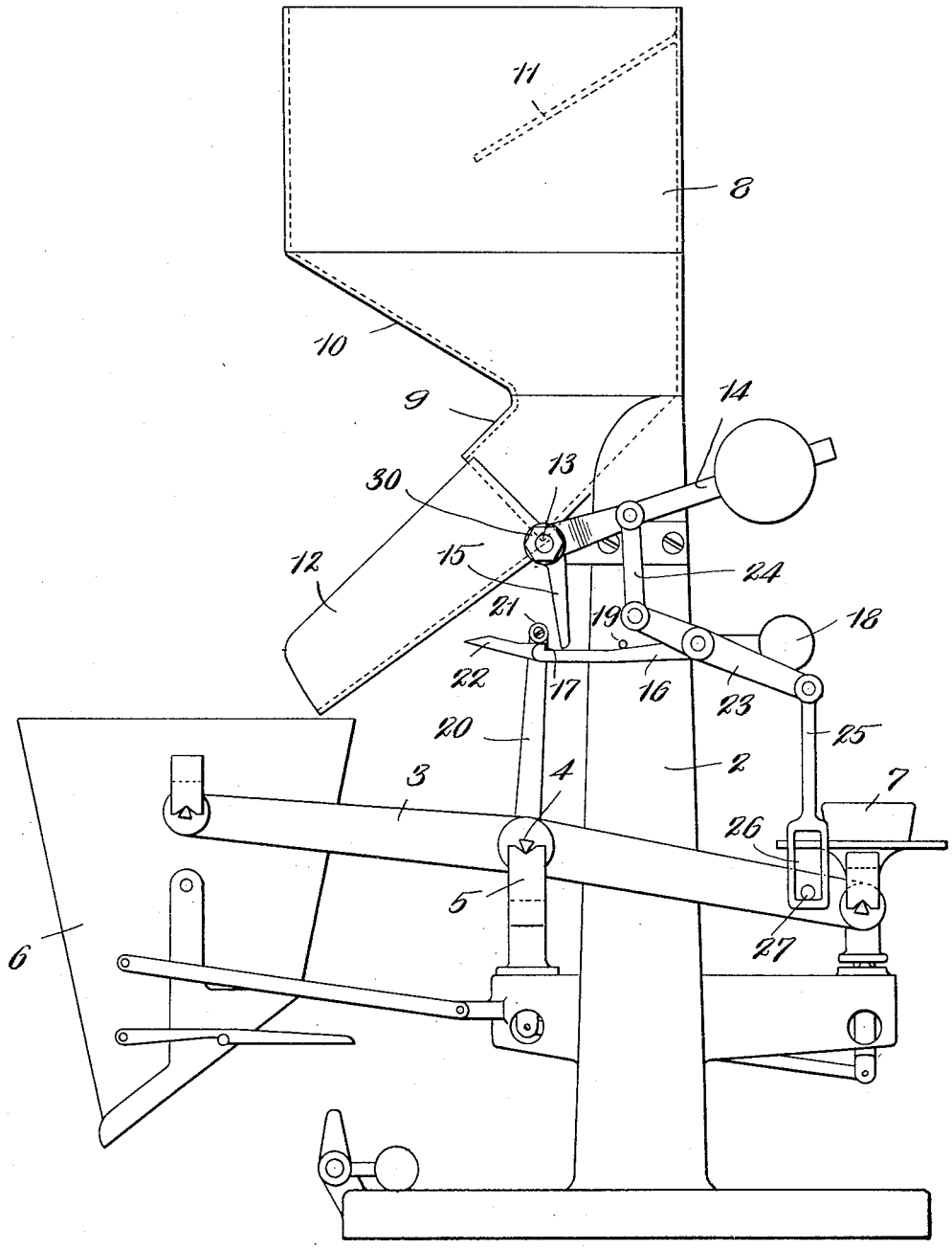
Figure 2:
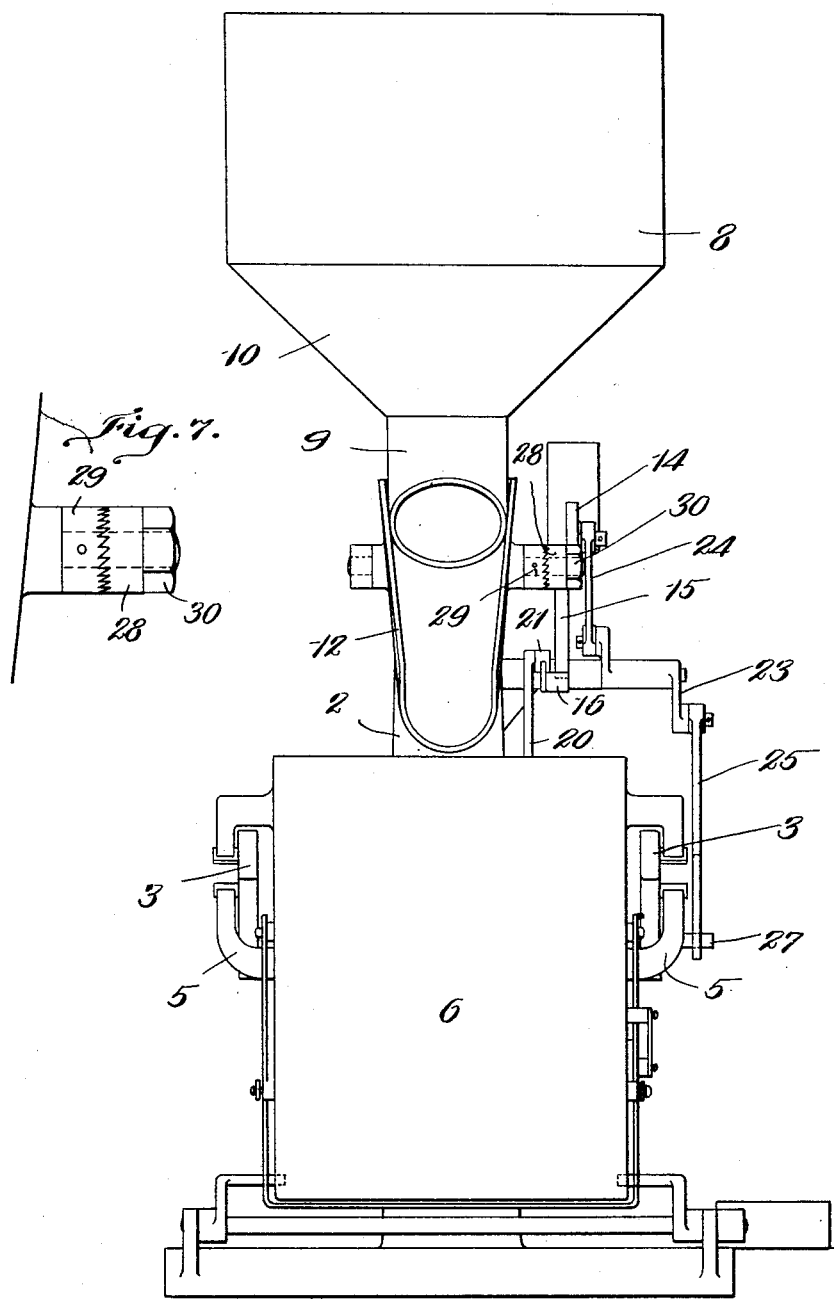
Figure 3:
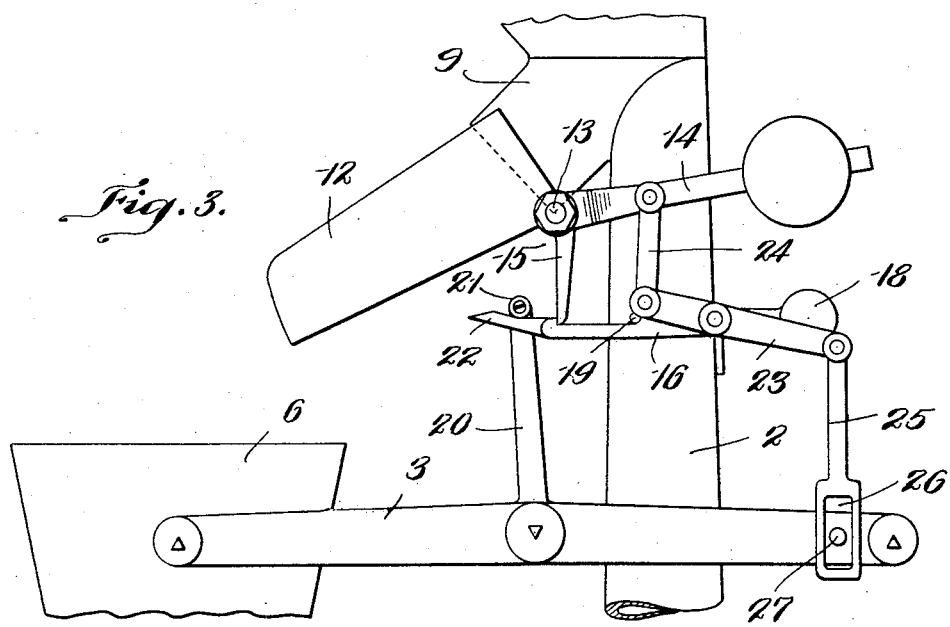
Figure 4:
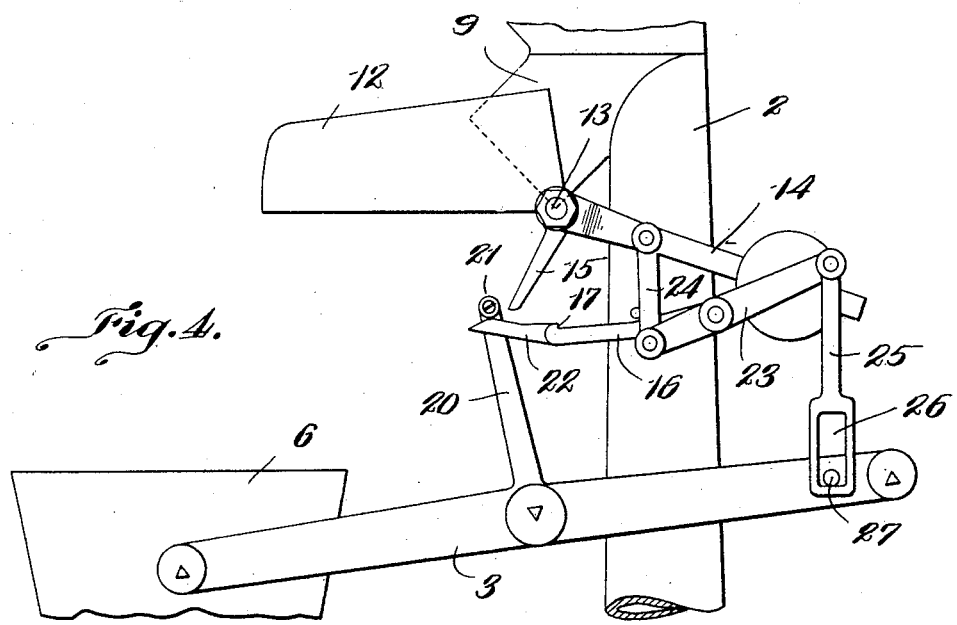

In the accompanying drawings, which illustrate my improvements as preferably constructed, Figure 1 is a side elevation showing my stream-delivering apparatus as employed in connection with an automatic weighing machine and provided with means operated by the weighing mechanism for controlling the flow of the material; Fig. 2 is a front elevation of the apparatus shown in Fig. 1; Figs. 3 and 4 are side elevations showing different positions of the stream-delivering parts of the apparatus illustrated in Figs. 1 and 2; Fig. 5 is a side elevation of my stream-delivering apparatus as a separate mechanism; Fig. 6 is a front elevation of the same; and Fig. 7 is a detail view showing an adjustment hereinafter described.

In Figs. 1 and 2 of the drawings is shown an automatic weighing machine comprising a standard 2 on which the moving parts are supported, a scale beam 3 having its fulcrums 4 resting on suitable fixed supports 5, a weighing bucket 6 suspended from one end of the beam 3, and a weighing weight 7 carried by the other end of said beam. The above-mentioned parts may be considered as typical of the functionally equivalent parts found in various types of automatic weighing machines, since their particular construction is not material to the present invention, and therefore it will be unnecessary to describe the same in detail or to describe various other parts shown in Figs. 1 and 2 which have to do with the discharge of the weighing bucket after it has been filled and may also be of any desired construction.

The material to be weighed in the bucket 6 is delivered thereto from a hopper 8 secured to the standard 2 above the top of said bucket and having, in the construction shown in the drawings, a discharge spout 9 leading from the lower end of the main portion of the hopper, a wall 10 which forms the bottom of the hopper above and in front of the spout 9, and a baffle plate 11 located within the hopper above the outlet opening which leads into the discharge spout 9 and extending forward from the rear wall of the hopper. The spout 9, wall 10 and baffle plate 11 are each slanted at such an angle as will cause the material operated upon to slide down them readily, the object of employing the baffle plate 11 being to prevent the material at the entrance to the spout 9 from being subjected to the weight of all the material above it, thus contributing to a free flow of material into said spout.

The spout 9 is preferably circular in cross section, and at its laterally and downwardly facing lower end is located the receiving end of a chute 12, the discharge end of which is located over the weighing bucket 6. This chute 12, which is preferably open at its top as well as at both ends, is mounted to rock on a horizontal axis located adjacent to its receiving end and in such position that the discharge from the spout 9 will always flow into said chute. Provision is thus made for the passage of a stream of material from the hopper 8 into the spout 9 and thence into, along and out of the chute 12 without its having to pass at any point through an orifice which is smaller than that provided by said spout 9.

It will be evident that if the chute 12 is inclined sufficiently to cause the material to slide down it a stream of material will flow into the weighing bucket, that the size of the stream will depend upon the angle of inclination of the chute, and that the stream will be cut off entirely whenever said chute is elevated sufficiently to cause the material to come to rest on its own load line. The chute 12 is thus adapted not only to deliver material to the bucket 6 but also to serve as a valve for reducing the stream to drip-stream size while a load is being completed and for cutting off the flow entirely as soon as the load has been completed, and all of these operations may be automatically performed by the action of the weighing machine itself. This may be done in various ways, but I prefer to employ the connecting mechanism shown in the drawings, in which the chute 12 is represented as secured to a shaft 13 journaled in suitable fixed bearings and having a weighted arm 14 and a finger 15 rigidly connected to it, with provision for adjusting the relation of said arm and finger to the chute 12 to vary the angle of the latter when in its various positions of rest, for the purpose hereinafter described. The weighted arm 14 is made heavy enough to elevate the spout 12 and the material which it carries whenever such movement is permitted, and the finger 15 coöperates with a suitable latch for holding said chute in a load-discharging position, preferably the drip-stream position, until the required weight is made in the bucket 6. This latch, shown at 16, is pivotally mounted on the standard 2 and has a stop shoulder 17 adapted to engage and arrest the free end of the finger 15 when the chute 12 is in the desired load-discharging position, said latch being normally maintained in operative position by means of a counterweight 18 tending to hold it against a stop pin 19.

For tripping the latch 16 after a load has been completed in the bucket 6 any suitable means may be employed, such as, for example, an arm 20 carried by and extending upward from the scale beam 3 and provided with a roller 21 adapted to run on a cam face formed on a portion 22 of the latch, said cam face being so shaped that when the bucket 6 descends after receiving a full load and the arm 20 moves forward as the beam 3 rocks on its fulcrum, the roller 21 by its engagement with the cam face will force the latch 16 downward without passing off the forward end of the same.

For raising the weighted arm 14 to reset the latch 16 I provide a lever 23 pivotally mounted on the standard 2 and connected at one end to said arm 14 by a link 24. On the other end of said lever 23 is pivotally suspended a link 25 having a slot 26 in its lower end, in which slot is located a pin 27 fixed to the beam 3. The parts just described are so proportioned and arranged that when the bucket 6 is in its uppermost position where it receives the material and the chute 12 is in position to deliver a full-size stream, the pin 27 is in engagement with the link 25 at the lower end of the slot 26, from which position said pin can move upward into the slot as the weighing bucket descends to its full-load position.

As thus constructed the operation is as follows: Starting with the position shown in Fig. 1, in which the bucket 6 is at the upper limit of its movement, the chute 12 is held in its position of maximum inclination by the engagement of the pin 27 with the lower end of the link 25, the weight of the arm 14 being so adjusted that its effect is overbalanced by the weighing weight 7. At this time, assuming that the stream delivered to the bucket 6 is to be cut down to a drip-stream before the final weight is completed, the finger 15 is out of contact with the abutment 17 on the latch 16, but as the load in the bucket approaches completion and the bucket begins to descend the chute 12 and the connected parts turn on their axes until the finger 15 reaches said abutment 17, whereby further movement of the chute 12 is temporarily arrested and said chute is held in such position that by reason of its reduced inclination a drip stream of material is now delivered to the bucket 6. This position of the parts, which is shown in Fig. 3, remains unchanged until the load in the bucket 6 is completed by the drip stream, whereupon the bucket descends to the limit of its downward movement and thereby trips the latch 16 as above explained. Thereupon the counterweighted arm 14 elevates the chute 12 until the flow of material therefrom is completely stopped, this movement of said chute being permitted by reason of the fact that the pin 27 has been elevated within the slot 26 by the partial descent of the bucket. When the parts reach this position, shown in Fig. 4, the load which has been weighed is discharged from the bucket 6, and thereupon the weight 7 elevates the empty bucket and also draws the link 25 downward, thereby restoring the chute 12 to its full-stream position. At the same time the finger 15 is moved backward to a position behind the abutment 17, and the roller 21, which does not move off the portion 22 of the latch 16 at any time, is carried back to the position shown in Fig. 1, whereupon the latch 16 is elevated into its operative position by the counterweight 18. All the parts being now restored to the position first described, another load is made up in the weighing bucket and the operations above described are repeated.

It is important to provide for adjusting the chute 12 with respect to the arm 14 and finger 15 in order that the inclination of said chute in its various positions of rest may be so varied as to secure the delivery of a stream of material of desired volume, regardless of the differences in the rate of flow of various materials over an inclined surface. This may be done in any suitable manner, as for example by providing said arm 14 and finger 15 with a hub 28 which is common to both of them and is mounted loosely on the shaft 13, said hub being provided on its inner end face with teeth adapted to mesh with corresponding teeth on a collar 29 fixed to said shaft 13, as shown in Fig. 7. A nut 30 mounted on the threaded end of the shaft 13 serves for clamping the hub 28 and collar 29 together and locking them in fixed relation to each other by the engagement of their teeth in any desired position of adjustment, which position can readily be varied by loosening said nut until the teeth are disengaged, then turning the arm 14 and finger 15 on the shaft 13, and then clamping the hub and collar together again, as will be readily understood. By means of the adjustment above described the chute 12 may be caused to deliver material to the bucket 6 as slowly as may be necessary or desirable to enable small loads to be accurately weighed, even though the spout 9 is large enough to prevent choking of its discharge orifice, while by increasing the normal inclination of the chute the rate of delivery of the material may be increased up to the full discharge capacity of said spout, so that the machine has a wide range of usefulness as regards the weighing of loads of different sizes.

The hopper and swinging chute above described are useful for the purpose of securing and regulating the delivery of a uniform stream of material in connection with various kinds of apparatus, and are individually illustrated in a slightly modified form in Figs. 5 and 6, in which the construction and arrangement of the hopper 8' with its discharge spout 9', slanting wall 10' and baffle plate 11' are substantially as above described. The swinging chute 12' is also constructed and arranged substantially like the chute 12, but its adjustment at various inclinations is preferably provided for in this case by securing to the shaft 13', which carries said chute 12', an arm 14' having at one end a headed bolt 31 arranged to slide in a slot 32 formed in a fixed plate 33, said bolt being provided with a threaded end carrying a thumb nut 34 by means of which the head of the bolt may be clamped against the plate 33 to lock the arm 14' and chute 12' in any position desired.

I have found by actual use that the hopper and chute above described will deliver an exceedingly uniform stream of a material having the physical characteristics of unground coffee without danger of interruption of the stream by choking or otherwise, and that the volume of the stream delivered may be accurately regulated by varying the inclination of the chute;—a result which, so far as I am aware, has not heretofore been accomplished with practical success by any arrangement depending upon gravity for producing the flow of material.

I claim:

1. The combination with automatic weighing mechanism of a supply hopper having a discharge spout slanting laterally and downwardly therefrom, a chute serving as a continuation of said spout and mounted to rock on a horizontal axis, and means controlled by the movements of the weighing mechanism for varying the inclination of said chute to control the flow of material through the same.

2. The combination with automatic weighing mechanism of a supply hopper having a discharge spout slanting laterally and downwardly therefrom, a chute serving as a continuation of said spout and mounted to rock on a horizontal axis, an operating arm connected to said chute, means for varying the angular relation between said chute and arm, and connections between said arm and the weighing mechanism for rocking the chute to control the flow of material through the same.

3. The combination with automatic weighing mechanism of a supply hopper having a discharge spout slanting laterally and downwardly therefrom, a chute serving as a continuation of said spout and mounted to rock on a horizontal axis, an operating arm and a stop finger connected to said chute and means for varying the angular relation of the chute thereto, a latch member coöperating with said stop finger to hold the chute in discharging position, and means controlled by the movement of the weighing mechanism for tripping said latch and for subsequently moving the chute into discharging position.

4. The combination in an automatic weighing machine of a supply hopper having a slanting discharge spout and a rocking chute serving as a continuation thereof, a scale beam, a load receptacle and a weighing weight carried thereby, a latch adapted to hold the chute in discharging position, means for tripping the latch when the scale beam poises, means for elevating the chute after the latch is tripped, and connections between the scale beam and the chute for moving the latter into discharging position.

5. The combination in an automatic weighing machine of a supply hopper having a slanting discharge spout and a rocking chute serving as a continuation thereof, a scale beam, a load receptacle and a weighing weight carried thereby, a latch adapted to hold the chute in discharging position and comprising a pivotally-mounted arm having a cam face thereon, a latch-tripping arm carried by the scale beam and movable along said cam face, means for elevating the chute after the latch is tripped, and connections between the scale beam and the chute for moving the latter into discharging position.

6. The combination in an automatic weighing machine of a supply hopper having a slanting discharge spout and a rocking chute serving as a continuation thereof, a scale beam, a load receptacle and a weighing weight carried thereby, connections between the scale beam and chute for moving the latter into full-steam position, means for elevating the chute, a latch adapted to arrest said chute in drip-stream position, and means operative with the poising of the scale beam for tripping said latch.

7. The combination in an automatic weighing machine of a supply hopper having a slanting discharge spout and a rocking chute serving as a continuation thereof, a scale beam, a load receptacle and a weighing weight carried thereby, a latch adapted to hold the chute in discharging position, means for tripping the latch when the scale beam poises, means for elevating the chute after the latch is tripped, and connections between the scale beam and the chute for moving the latter into discharging position and comprising a slotted member and an abutment movable therein to permit unrestricted poising of the scale beam.

8. The combination in an automatic weighing machine of a supply hopper having a slanting discharge spout and a rocking chute serving as a continuation thereof, a scale beam, a load receptacle and a weighing weight carried thereby, a weighted arm connected to the chute and tending to elevate the same, a stop finger movable therewith, a latch member having an abutment located in position to be engaged by said stop finger when the chute is in a discharging position, means for tripping the latch when the scale beam poises, and connections between the scale beam and weighted arm for raising the latter.

9. The combination in an automatic weighing machine of a supply hopper having a slanting discharge spout and a rocking chute serving as a continuation thereof, a scale beam, a load receptacle and a weighing weight carried thereby, a weighted arm connected to the chute and tending to elevate the same, a stop finger movable therewith, a latch member having an abutment located in position to arrest said stop finger when the chute is in drip-stream position, means for tripping said latch member when the scale beam poises, and connections between the scale beam and weighted arm for raising the latter, with provision for lost motion in said connections to permit unrestricted poising of the scale beam.

10. The combination in an automatic weighing machine of a supply hopper having a slanting discharge spout and a rocking chute serving as a continuation thereof, a scale beam, a load receptacle and a weighing weight carried thereby, a weighted arm connected to the chute and tending to elevate the same, a stop finger movable therewith, a latch member having an abutment located in position to arrest said stop finger when the chute is in drip-stream position, means for tripping said latch member when the scale beam poises, and connections between the scale beam and weighted arm comprising a slotted link and a pin carried by the scale beam and movable in the slot in the link.

11. The combination with a supply hopper having a discharge spout slanting laterally and downwardly therefrom, of a chute serving as a continuation of said spout and mounted to rock on a horizontal axis, and means for varying the inclination of said chute, the discharge passage from the hopper to the free end of the chute being uncontracted in any position of said chute.

12. The combination with a supply hopper having a discharge spout slanting laterally and downwardly therefrom and a bottom wall leading to the entrance to said spout and slanting in the opposite direction, a chute serving as a continuation of said spout and mounted to rock on a horizontal axis, and means for varying the inclination of said chute, the discharge passage from the hopper to the free end of the chute being uncontracted in any position of said chute.

13. The combination with a supply hopper having a discharge spout extending laterally and downwardy therefrom and also having a bottom wall leading to the entrance to said spout and a baffle plate located above said entrance and bottom wall, said baffle plate, bottom wall and spout being slanting alternately in opposite directions at substantially the same inclination, of a chute serving as a continuation of said spout and mounted to rock on a horizontal axis, and means for varying the inclination of said chute, the discharge passage from the hopper to the free end of the chute being uncontracted in any position of said chute.

Signed by me at Newark, N. J., this seventh day of January 1913.

JOHN D. WEBBER.

Witnesses:
  WILLIAM BROWN,
  G. GOUVERNEUR ASHWELL.

Copies of this patent may be obtained for five cents each, by addressing the "Commissioner of Patents, Washington, D. C."